(12) United States Patent
Nam

(10) Patent No.: US 12,109,977 B2
(45) Date of Patent: Oct. 8, 2024

(54) CARD KEY AND METHOD OF CONTROLLING VEHICLE USING THE SAME

(71) Applicants: HYUNDAI MOTOR COMPANY, Seoul (KR); KIA CORPORATION, Seoul (KR)

(72) Inventor: Minhwan Nam, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 538 days.

(21) Appl. No.: 17/410,680

(22) Filed: Aug. 24, 2021

(65) Prior Publication Data

US 2022/0134998 A1 May 5, 2022

(30) Foreign Application Priority Data

Oct. 29, 2020 (KR) ........................ 10-2020-0142421

(51) Int. Cl.
*B60R 22/00* (2006.01)
*B60R 25/04* (2013.01)
*B60R 25/24* (2013.01)

(52) U.S. Cl.
CPC .............. *B60R 25/24* (2013.01); *B60R 25/04* (2013.01); *B60R 2325/103* (2013.01)

(58) Field of Classification Search
CPC ... B60R 25/24; B60R 25/04; B60R 2325/103; B60R 25/243; B60R 25/406; B60R 25/10; B60R 25/34; B60R 22/00; G07C 9/00309; G07C 2009/00769; G07C 2009/00976; G07C 9/00182; G07C 2009/00547; G07C 2209/02; G07C 2209/08
USPC .......................................................... 701/36
See application file for complete search history.

(56) References Cited

U.S. PATENT DOCUMENTS

| | | | |
|---|---|---|---|
| 2009/0153294 A1* | 6/2009 | Katagiri | ................ E05B 35/007 340/5.61 |
| 2012/0012659 A1* | 1/2012 | Sugimoto | .......... G07C 9/00944 235/492 |
| 2019/0025856 A1* | 1/2019 | Turato | ................... H04L 9/3234 |
| 2019/0256047 A1* | 8/2019 | Iwashita | ............. G01S 13/0209 |
| 2021/0246693 A1* | 8/2021 | Elangovan | ............... G06F 21/44 |

* cited by examiner

*Primary Examiner* — Shardul D Patel
(74) *Attorney, Agent, or Firm* — SLATER MATSIL, LLP

(57) ABSTRACT

A card key for receiving specific functions from a vehicle is provided. The card key includes a card key memory configured to store authority information for controlling a specific functions of the vehicle; and a card key communication module configured to transmit a signal for receiving the specific functions to a vehicle communication module and the stored authority information. The card key communication module may be configured to receive information input to a user terminal from the user terminal. The stored authority information may be changed based on the input information.

19 Claims, 7 Drawing Sheets

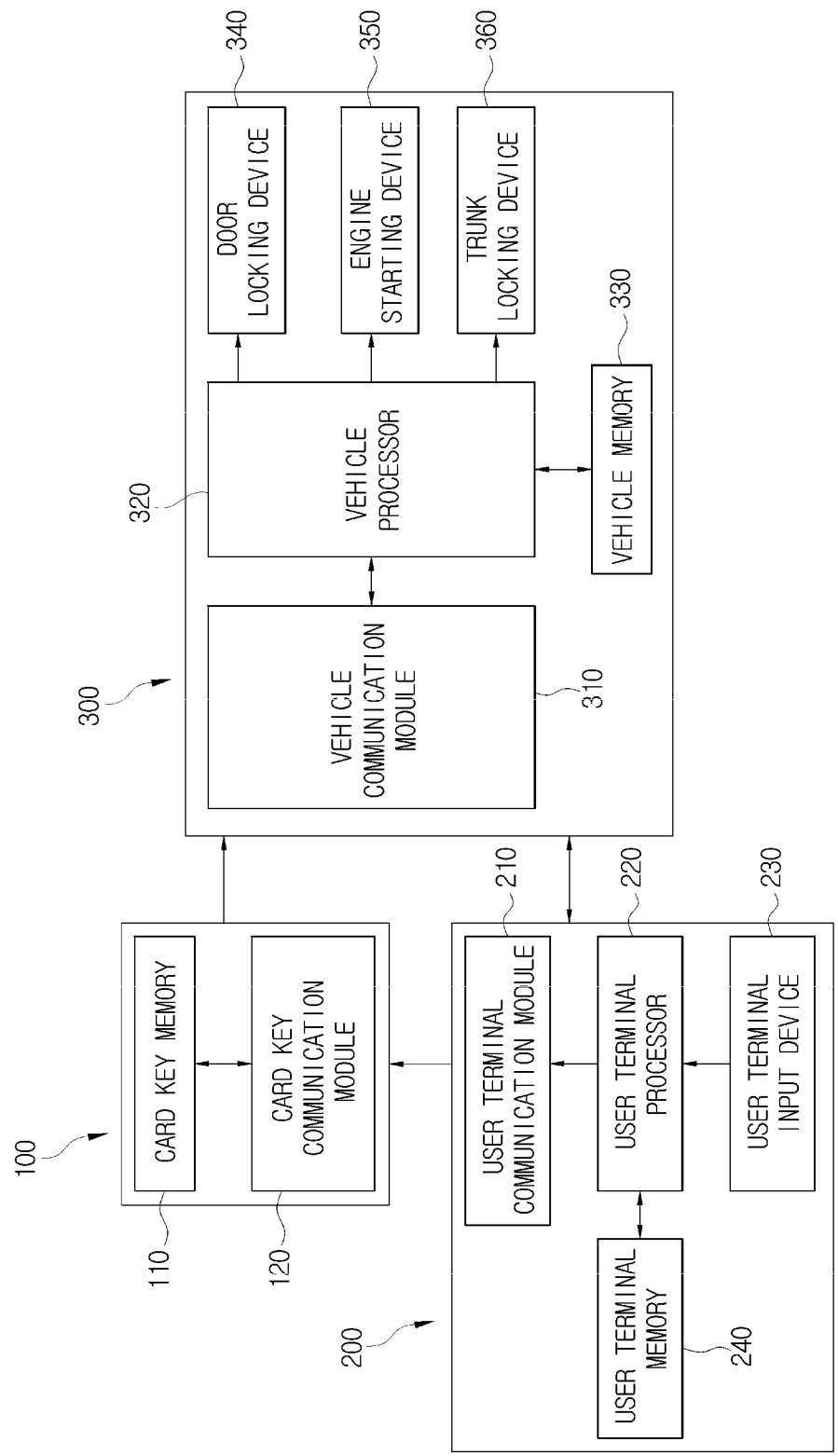

CARD KEY AND METHOD OF CONTROLLING VEHICLE USING THE SAME

CROSS-REFERENCE TO RELATED APPLICATION

This application claims the priority to and the benefit of Korean Patent Application No. 10-2020-0142421, filed on Oct. 29, 2020, the disclosure of which is incorporated herein by reference in its entirety.

TECHNICAL FIELD

The disclosure relates to a card key and a vehicle control method using the card key, and more particularly, to a card key capable of controlling a vehicle, and a method of controlling the vehicle in which the card key is registered.

BACKGROUND

With the development of vehicle IT technology, today's vehicles provide various functions for user convenience in addition to functions as basic means of transportation.

More specifically, an existing vehicle access method was a physical method of directly inserting a key into the vehicle, but recently, technologies have been developed that allow access to the vehicle in a more convenient manner, such as a smart key or a digital key that is recognized wirelessly at a certain distance outside the vehicle and controls an unlocking of a door.

A smart key system authenticated the smart key by transmitting an LF (Low Frequency) signal to a smart key from a smart key controller (SMK ECU) to determine whether the smart key has proper authority for the vehicle and receiving a radio frequency (RF) response signal for the corresponding LF signal from the smart key.

However, in recent years, a research on a vehicle access start system that opens the door of the vehicle through a Near Field Communication (NFC) communication instead of such a communication method has been conducted.

SUMMARY

An aspect of the disclosure is to provide a card key capable of preventing a risk of vehicle theft when the card key is lost or rented by allowing or limiting control through the card key for each vehicle function, and a method of controlling a vehicle.

Additional aspects of the disclosure will be set forth in part in the description which follows and, in part, will be obvious from the description, or may be learned by practice of the disclosure.

According to an aspect of the disclosure, there is provided a card key, which uses to receive specific functions from a vehicle. The card key including: a card key memory configured to store authority information for controlling a specific functions of the vehicle; and a card key communication module configured to transmit a signal for receiving the specific functions to a vehicle communication module and the stored authority information. The card key communication module may be configured to receive information input to a user terminal from the user terminal. The stored authority information may be changed based on the input information.

The card key memory may be configured to store card key information. The authority information may be changed based on the input information in response to a case where the card key information is included in registration card key information stored in the user terminal.

The registration card key information may be information of the card key registered in the vehicle received by the user terminal from the vehicle. The card key information may be information including the authority information.

The specific functions may be at least one or more functions provided by the vehicle. The authority information may include information about functions that are allowed to be provided through the card key among the specific functions and functions to which provision is limited.

The specific functions may include a door unlock function and an engine start function of the vehicle using the card key. The authority information may include information for limiting a provision of the engine start function using the card key by the vehicle.

The specific functions may further include a trunk unlock function of the vehicle using the card key. The authority information may include information for limiting a provision of the door unlock function using the card key by the vehicle.

The card key memory may be configured to store expiration date information that is the basis for determining whether or not the vehicle provides the specific functions. The card key communication module may be configured to transmit the stored expiration date information to the vehicle communication module. The stored expiration date information may be changed based on the input information.

The card key communication module may be configured to communicate with the vehicle or the user terminal in a Near Field Communication (NFC) method.

According to another aspect of the disclosure, there is provided a method of controlling a vehicle, the vehicle providing specific functions in which a card key is used. The method including: receiving a signal for providing the specific functions from the card key; receiving changed authority information based on information input to a user terminal from the card key; and determining whether to provide the specific functions based on the authority information.

The authority information may be changed based on the input information in response to a case where the card key information is included in registration card key information stored in the user terminal.

The method may further include transmitting registration card key information stored in a vehicle memory to a user terminal communication module. The registration card key information may be information of the card key registered in the vehicle. The card key information may be information including the authority information.

The specific functions may be at least one or more functions provided by the vehicle. The authority information may be information about functions that are allowed to be provided through the card key among the specific functions and functions to which provision is limited.

The specific functions may include a door unlock function and an engine start function of the vehicle using the card key. The authority information may include information for limiting a provision of the engine start function using the card key by the vehicle.

The specific functions may further include a trunk unlock function of the vehicle using the card key. The authority information may include information for limiting a provision of the door unlock function using the card key by the vehicle.

The method may further include receiving expiration date information changed based on information input to the user terminal from the card key; and determining whether to provide the specific functions requested from the card key based on the expiration date information.

The receiving of the signal from the card key and the authority information may include receiving through a Near Field Communication (NFC) communication method.

According to another aspect of the disclosure, there is provided a non-transitory computer readable medium containing program instructions executed by a processor in combination with a user terminal including a user terminal input device and a user terminal communication module. The computer readable medium including: program instructions that generate an authority information change signal for changing authority information stored in a card key based on a user input received by the user terminal input device; and program instructions that control the user terminal communication module to transmit the generated authority information change signal to the card key. The authority information may be information that is a basis for determining whether or not a vehicle provides specific functions requested from the card key.

The computer readable medium may further include program instructions that store registration card key information received by the user terminal communication module from a vehicle communication module in a user terminal memory; program instructions that determine whether card key information received from a card key communication module is included in the registration card key information; and program instructions that generate the authority information change signal for changing the authority information stored in the card key based on the card key information being included in the registration card key information.

The computer readable medium may further include program instructions that generate an expiration date information change signal for changing expiration date information stored in the card key based on the user input received by the user terminal input device; and program instructions that control the user terminal communication module to transmit the generated expiration date information change signal to the card device. The expiration date information may be information that is the basis for determining whether or not the vehicle provides specific functions requested from the card key.

DRAWINGS

These and/or other aspects of the disclosure will become apparent and more readily appreciated from the following description of the forms, taken in conjunction with the accompanying drawings of which:

FIG. 2 is a control block diagram of a vehicle in one form of the present disclosure.

DETAILED DESCRIPTION

Figure 1:
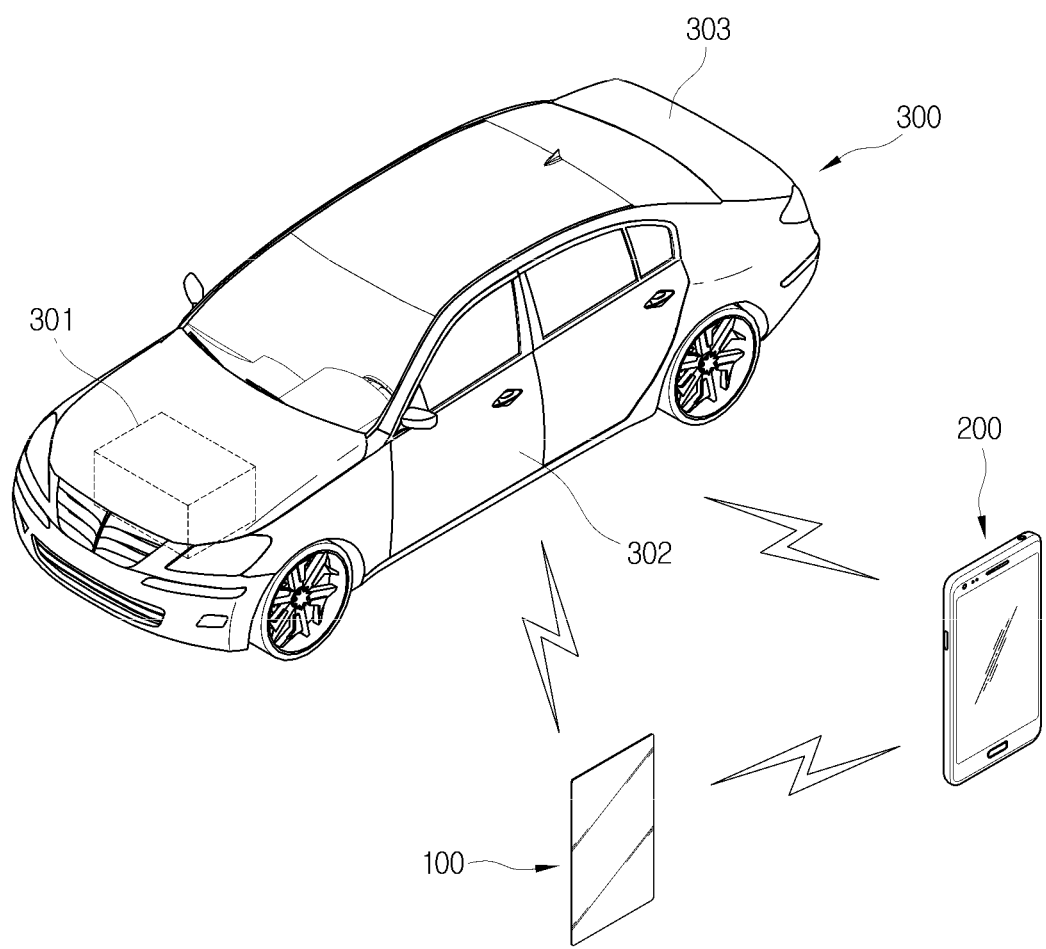
FIG. 1 is a view illustrating appearances of a card key, a user terminal, and a vehicle in one form of the present disclosure.

Like reference numerals refer to like elements throughout the specification. Not all elements of the forms of the disclosure will be described, and the description of what are commonly known in the art or what overlap each other in the exemplary forms will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and forms of the disclosure will be described with reference to accompanying drawings.

FIG. 1 is a view illustrating appearances of a card key, a user terminal, and a vehicle in some forms of the present disclosure, and FIG. 2 is a control block diagram of a vehicle in some forms of the present disclosure.

Referring to FIGS. 1 and 2, a card key 100 may include a card key memory 110 and a card key communication module 120.

A user terminal 200 may include a user terminal communication module 210, a user terminal processor 220, and a user terminal input device 230.

A vehicle 300 includes an engine 301, a door 302, a trunk 303, a vehicle communication module 310, a vehicle processor 320, a vehicle memory 330, a door locking device 340, and an engine starting device 350, and a trunk locking device 360.

The card key 100 may have its own power supply device. However, the card key 100 may communicate with the vehicle 300 using power derived from the vehicle communication module 310 without its own power supply device, or may communicate with the user terminal 200 using the power derived from the user terminal communication module 210.

The vehicle 300 may provide a specific function in which the card key 100 is used to a user.

The specific function may be at least one or more functions that the user can receive from the vehicle 300 through the card key 100. The specific function that can be provided by the vehicle 300 through the card key 100 may include a door unlock function for unlocking the door 302 of the vehicle 300, an engine start function for starting the engine 301 of the vehicle 300, and a trunk unlock function for unlocking a door of the trunk 303.

For example, when attempting to unlock the door of the vehicle 300 by using the card key 100, the user may place the card key 100 in contact with or near the door 302 so that the vehicle communication module 310 communicates with the card key communication module 120. In this case, the vehicle communication module 310 may transmit information received from the card key communication module 120 to the vehicle processor 320. The vehicle processor 320 may control the door locking device 340 to unlock of the vehicle 300 when it is determined that the card key 100 is the card key 100 registered in the vehicle 300 based on the information received from the card key 100.

The card key communication module 120 may perform a Near Field Communication (NFC) communication or a Bluetooth communication with the vehicle communication module 310 or the user terminal communication module 210, but is not limited thereto.

The NFC communication, as one of the wireless tag (RFID) technologies, is a communication technology that transmits and receives wireless data within a short distance of 10 cm, and because of a short communication distance, it is a short-range communication technology with relatively excellent security and low price. The Bluetooth communication is a communication technology that enables low-power wireless communication between information devices that are distant from several meters to tens of meters.

The vehicle communication module 310 may include a communication module mounted on the door 302, a communication module provided in the trunk 303, and a card key charging pad provided inside the vehicle 300.

The vehicle communication module 310 may perform the NFC communication or the Bluetooth communication with the user terminal communication module 210, but is not limited thereto.

In general, the card key 100 is very thin, usually within 1 mm, so there is a possibility of loss or theft while the user holds the card key 100. Accordingly, there is a need for an apparatus or method for preventing another person from using the vehicle 300 by acquiring a card when the user loses or is stolen the card key 100. In addition, depending on the user's intention, it is possible to allow a use of the card key 100 for some of specific functions, and limit the use of the card key 100 for some other specific functions, even if the same card key is used for the same vehicle. There is a need for an apparatus or method that provides allowed functionality and does not provide disallowed functionality.

The card key memory 110 may store authority information that is a basis for determining whether the vehicle 300 provides the specific function requested through the card key 100.

The authority information may include information about a function that is allowed to be provided through the card key 100 and a function to which provision is limited among the specific functions. For example, the authority information may include information limiting a provision of the engine start function using the card key 100, information limiting a provision of the door unlock function using the card key 100, and information limiting a provision of the trunk unlock function using the card key 100.

The card key memory 110 may store expiration date information that is a basis for determining whether or not the vehicle 300 provides the specific function.

The expiration date information may be information about a preset time during which provision of the specific function through the card key 100 is allowed. For example, when the user wishes to allow the provision of the specific function through the card key 100 only for a desired period, the expiration date information may include information about the preset time, which is a period desired by the user.

The preset time may be different for each specific function in which the card key 100 is used.

The card key memory 110, the user terminal memory 240, and the vehicle memory 330 may store programs that perform the above-described operations and later-described operations. The user terminal processor 220 and the vehicle processor 320 may execute the stored programs. In the case where each memory and each processor are plural, they may be integrated into one chip, or may be provided in physically separate locations. Each memory may include a volatile memory such as a static random access memory (S-RAM) and a dynamic random access memory (D-RAM) for temporarily storing data. Furthermore, the each memory may include non-volatile memory such as a ROM (Read Only Memory), an Erasable Programmable Read Only Memory (EPROM), and an EEPROM (Electrically Erasable Programmable Read Only Memory: EEPROM) for storing control programs and control data for a long time. The each processor may include various logic circuits and operation circuits, may process data according to a program provided from the each memory, and may generate a control signal according to the processing result.

When the user wants to receive the specific function of the vehicle 300 using the card key 100, the user may approach the card key 100 to the vehicle communication module 310 corresponding to the specific function so that the vehicle communication module 310 communicates with the card key communication module 120. At this time, the card key communication module 120 may transmit a signal for receiving the specific function to the vehicle communication module 310, the authority information and the expiration date information stored in the card key 100. The vehicle communication module 310 may transmit the authority information and the expiration date information received from the card key communication module 120 to the vehicle processor 320.

The vehicle processor 320 may determine whether to provide the specific function requested through the card key 100 based on the authority information.

The vehicle processor 320 may not perform the requested specific function if the authority information includes information limiting the provision of the specific function requested through the card key 100. Conversely, the vehicle processor 320 can control the configuration of the vehicle 300 to perform a specific function requested if the authority information does not contain information that limits the provision of the specific function requested through the card key 100.

The vehicle processor 320 may determine whether to provide the specific function requested through the card key 100 based on the expiration date information.

That is, when the user requests to provide the specific function through the card key 100, the vehicle processor 320 may not perform the requested specific function if a preset time for which the specific function is allowed to be provided has already passed.

The door locking device 340 may lock the door 302 of the vehicle 300 or unlock the door 302 based on a signal received from the vehicle processor 320.

The engine starting device 350 may turn on the engine 301 of the vehicle 300 based on the signal received from the vehicle processor 320.

The trunk locking device 360 may lock the trunk 303 of the vehicle 300 or unlock the trunk 303 based on the signal received from the vehicle processor 320.

The user terminal input device 230 may be a component for receiving information from the user. The user terminal input device 230 may include a button provided to receive a command input from the user. In this case, the button may be implemented as a hard key type having a mechanical structure, or may be implemented as a soft key type so that the command can be input through a touch input method. The user terminal input device 230 may be displayed on a display provided in the user terminal 200 to receive the command through the touch input method.

The user may input information into the user terminal input device 230 to change the authority information and the expiration date information stored in the card key memory 110. In this case, the user terminal input device 230 may transmit the input information to the user terminal processor 220.

The user terminal processor 220 may control the user terminal communication module 210 to change the authority information and the expiration date information stored in the card key 100 based on the input information. In this case, the authority information and the expiration date information stored in the card key memory 110 may be changed based on the information received from the user terminal communication module 210 by the card key communication module 120.

The user terminal 200 may not be able to change the authority information stored in any card key 100. The user terminal 200 may need to receive an authority to change the authority information stored in a specific card key 100 from the vehicle 300 in advance. That is, the user terminal 200 may receive the information about the card key 100 registered in the vehicle 300 in advance from the vehicle 300, and later, when the user approaches the card key 100 to the user terminal 200 in order to change the authority information stored in the card key 100, the authority information may be changed only when the accessed card key 100 is the card key 100 corresponding to card key information received from the vehicle 300.

That is, changing the authority information stored in the card key 100 through the user terminal 200 may be possible only when information about the card key registered in the vehicle 300 is stored in the user terminal 200.

When the card key 100 is within a communication distance with the user terminal 200, the user terminal processor 220 may control the user terminal communication module 210 to change the authority information and the expiration date information based on the input information.

At this time, the user terminal communication module 210 may receive the card key information stored in the card key memory 110 from the card key 100.

The card key information may be information unique to the corresponding card key 100. In addition, the card key information may be information including the authority information and encryption key information corresponding to the vehicle 300.

When registration card key information stored in the user terminal memory 240 includes the card key information stored in the card key 100, the user terminal processor 220 may change the authority information stored in the card key 100 based on the input information.

How the user terminal 200 receives the registration card key information including information about the card key registered in the vehicle 300 from the vehicle 300 will be described later with reference to FIGS. 5A and 5B.

Figure 3A:
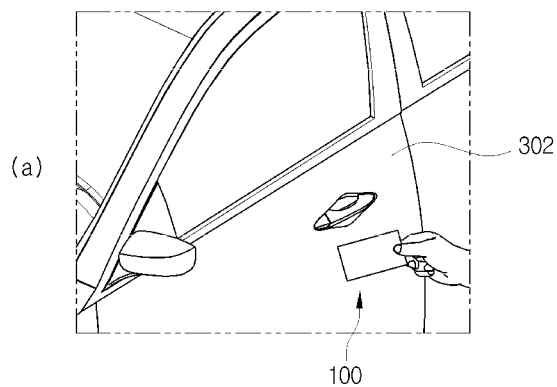
FIG. 3A is a view for describing an example of using a card key to receive a door unlock function in one form of the present disclosure.
Figure 3B:
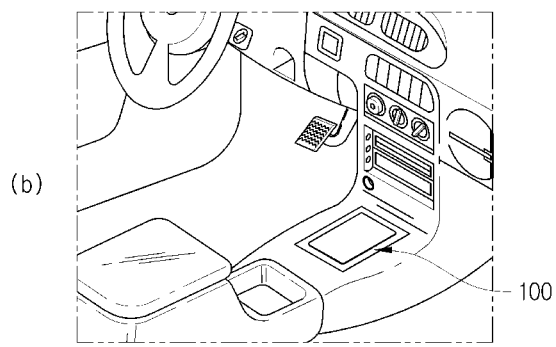
FIG. 3B is a view for describing an example of using a card key to receive an engine start function in one form of the present disclosure.
Figure 3C:
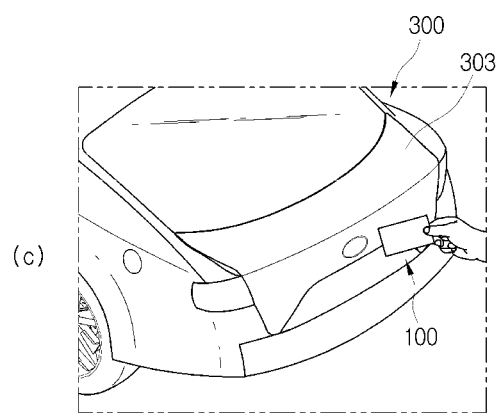
FIG. 3C is a view for describing an example of using a card key to receive a trunk unlock function in one form of the present disclosure.

FIG. 3A is a view for describing an example of using a card key to receive a door unlock function in some forms of the present disclosure, FIG. 3B is a view for describing an example of using a card key to receive an engine start function in some forms of the present disclosure, and FIG. 3C is a view for describing an example of using a card key to receive a trunk unlock function in some forms of the present disclosure.

The user may not normally use the card key 100, but may use the card key 100 only when there is a special case or leave the card key 100 to another person. In this case, the user may wish to limit all or only some of the specific functions of the vehicle 300 available through the card key 100, and may wish to allow the use of the specific functions only at a specified time.

Referring to FIGS. 3A, 3B and 3C, the user may access the card key 100 to the communication module corresponding to the specific function so that the card key communication module 120 communicates with the vehicle communication module 310. At this time, the card key communication module 120 may transmit a signal for receiving the specific function to the vehicle communication module 310, the authority information and the expiration date information stored in the card key 100.

For example, when the user wants to unlock the door 302 of the vehicle 300 by using the card key 100, the card key 100 may be brought into contact with or placed near the door 302 so that the vehicle communication module 310 mounted on the door 302 communicates with the card key communication module 120. When starting the engine 301 of the vehicle 300 using the card key 100, the card key 100 may be brought into contact with or placed near the card key charging pad so that the vehicle communication module 310 mounted on the card key charging pad communicates with the card key communication module 120. In a case of unlocking the trunk 303 using the card key 100, the card key 100 may be brought into contact with the trunk 303 or placed nearby so that the vehicle communication module 310 provided in the truck 303 communicates with the card key communication module 120.

If the authority information stored in the card key 100 includes information limiting the door unlock function and the engine start function, the user may unlock the trunk 303 of the vehicle 300 using the card key 100. However, unlocking the door 302 or starting the engine 301 may be limited.

At this time, when the user contacts or places the card key 100 on the trunk 303, the vehicle processor 320 may control the trunk locking device 360 to unlock the trunk 303 because the authority information received from the card key communication module 120 does not include information limiting the trunk unlock function. However, when the user places the card key 100 in contact with or near the door 302, the vehicle processor 320 may not control the door locking device 340 because the authority information received from the card key communication module 120 includes information limiting the door unlock function.

The vehicle processor 320 may determine whether to provide each specific function based on valid period information received from the card key communication module 120.

For example, according to the preset time information of the door unlock function included in the valid period information, it is a time when the door unlock function is still allowed. According to the preset time information of the engine start function, when the engine start function is limited after a time allowed for the engine start function has passed, the user may unlock the door 302 using the card key 100.

In this way, the user may allow a person using the card key 100 to receive only the specific functions of the vehicle 300, and the specific functions that can be provided may be determined in advance through the user terminal 200. In addition, the user may allow the person using the card key 100 to receive the specific function of the vehicle 300 only within a time set for each specific function, and a time set for each specific function may be set in advance through the user terminal 200.

Figure 4:
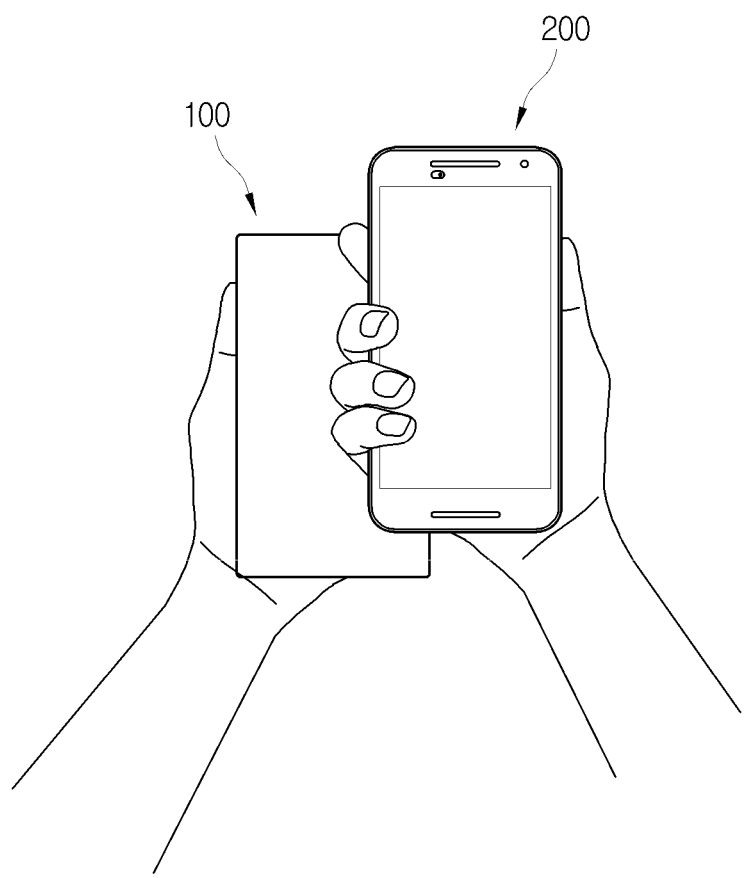
FIG. 4 is a view for describing an example of changing authority information and expiration date information stored in a card key through a user terminal in one form of the present disclosure.

FIG. 4 is a view for describing an example of changing authority information and expiration date information stored in a card key through a user terminal in some forms of the present disclosure.

Referring to FIG. 4, the user may access the card key 100 to the user terminal communication module 210 provided in the user terminal so that the card key communication module 120 communicates with the user terminal communication module 210.

Although the user is originally allowed, the specific function that intends to limit the use through the card key 100 may be input to the user terminal input device 230 in the future.

For example, when the user originally allowed all of the door unlock function, the trunk unlock function, and the engine start function using the card key 100, but wants to limit only the engine start function using the card key 100 in the future, the user may input information indicating that the engine start function originally allowed in the user terminal input device 230 is limited. At this time, the user terminal processor 220 may control the user terminal communication module 210 to include information limiting the provision of the engine start function in the authority information stored in the card key 100, and may include information that limits the provision of the engine start function that was not originally provided with the authority information stored in the card key memory 110. At this time, since the authority information still does not include information limiting the door unlock function and the trunk unlock function, the vehicle 300 may provide the door unlock function and the trunk unlock function in which the card key 100 is used in the future.

Although the user was originally limited, the specific function to be allowed to be used through the card key 100 in the future may be input into the user terminal input device 230.

For example, when the user originally limited the door unlock function and the engine start function using the card key 100, but wants to limit the door lock function using the card key 100 in the future, the user may input information indicating that the door lock function originally limited in the user terminal input device 230 is allowed. At this time, the user terminal processor 220 may control the user terminal communication module 210 to delete information limiting the provision of the door lock function in the authority information stored in the card key 100. At this time, since the authority information still includes information limiting the engine start function, the vehicle 300 may not provide the engine start function in which the card key 100 is used in the future.

The user may input the period in which the use of the specific function through the card key 100 is allowed into the user terminal input device 230.

For example, originally there was no period limit for providing the specific function, but if the user wants to allow the provision of the specific function only for a desired period in the future, the desired period may be input to the user terminal input device 230. In this case, the user terminal processor 220 may control the user terminal communication module 210 to change the expiration date information stored in the card key 100 based on the input period.

In addition, it is possible to change a period in which the original specific function was available through the above-described process to a new period, and it is also possible to change the expiration date information for each specific function that can be provided through the card key 100.

Figure 5A:
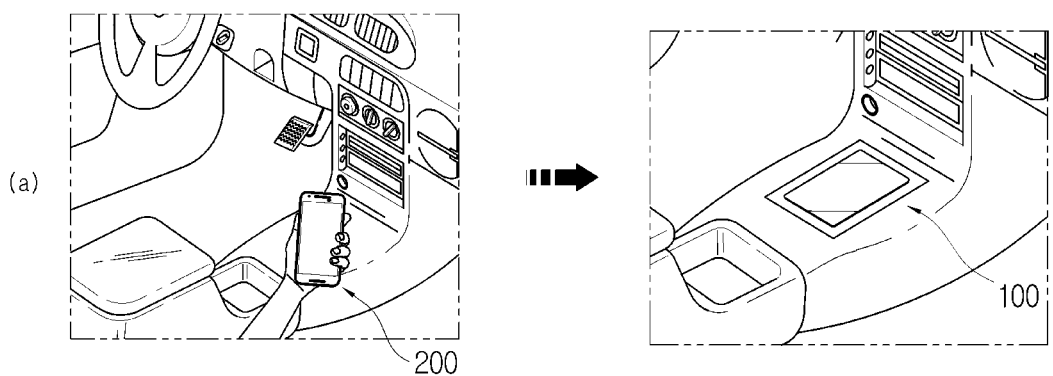
FIG. 5A is a view for describing an example in which registration card key information is first registered in a user terminal and registering a card key in a vehicle in one form of the present disclosure.
Figure 5B:
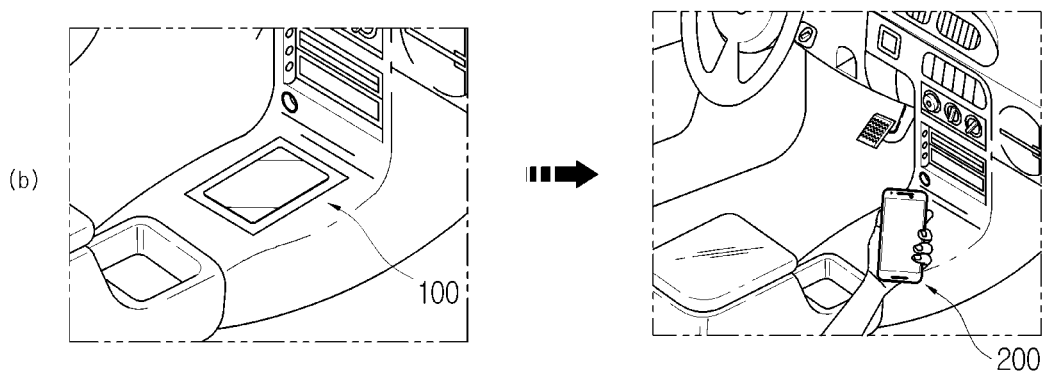
FIG. 5B is a view for describing an example in which a card key is first registered in a vehicle and registration card key information is stored in a user terminal in one form of the present disclosure.

FIG. 5A is a view for describing an example in which registration card key information is first registered in a user terminal and registering a card key in a vehicle in some forms of the present disclosure, and FIG. 5B is a view for describing an example in which a card key is first registered in a vehicle and registration card key information is stored in a user terminal in some forms of the present disclosure.

Referring to FIG. 5A, the user may first store information of the card key 100 in the user terminal memory 240 and later store the card key 100 in the vehicle memory 330.

The user may input a command to the input device of the vehicle 300 to transmit the registration card key information stored in the vehicle memory 330 to the user terminal 200. In this case, the vehicle processor 320 may generate card key information, and the registration card key information may include the generated card key information.

The registration card key information may be information about the card key 100 registered in the vehicle 300. That is, the registration card key information may be information about the card key 100 that can request the vehicle 300 to provide the specific function. In this case, there may be a plurality of card keys 100 registered in the vehicle 300.

A blank card may be a card in which no information about the vehicle 300 is yet stored.

The generated card key information may be information that is the basis for later storing the blank card to change the blank card to the card key 100 registered in the vehicle 300.

The card key information may include the encryption key information corresponding to the vehicle 300. The encryption key information may be information including the same encryption key as an encryption key included in the processor of the vehicle 300. The vehicle processor 320 may control the vehicle communication module 310 to transmit the registration card key information including the generated card key information to the user terminal communication module 210.

The user terminal processor 220 may store the registration card key information received by the user terminal communication module 210 in the user terminal memory 240.

The user may later register the blank card as the card key 100 of the vehicle 300. At this time, the user may contact the blank card to the card key charging pad or place it nearby so that the vehicle communication module 310 provided in the card key charging pad performs communication with a communication module of the blank card.

The vehicle processor 320 may control the vehicle communication module 310 to transmit the previously generated card key information to the blank card and store the generated card key information in a memory of the blank card. In this case, when the card key information generated by the vehicle processor 320 is stored in the memory of the blank card, the blank card may be changed to the card key 100 registered in the vehicle 300.

Referring to FIG. 5B, the user may first register the card key 100 in the vehicle memory 330 and later store the card key information in the user terminal memory 240.

The user may first register the card key 100 in the vehicle 300. At this time, the user may make the vehicle communication module 310 provided on the card key charging pad perform communication with a communication module of the card key 100 by contacting or placing the card key 100 on or near the card key charging pad. In addition, the card key communication module 120 may transmit the card key information stored in the card key memory 110 to the vehicle communication module 310.

The vehicle processor 320 may include the card key information received by the vehicle communication module 310 into the registration card key information and store it in the vehicle memory 330.

The user may store the registration card key information in the user terminal 200 later. In this case, the user may input the command to transmit the registration card key information to the user terminal 200 to the input device of the vehicle 300. The vehicle processor 320 may control the vehicle communication module 310 to transmit the registration card key information including the card key information to the user terminal communication module 210, and the user terminal processor 220 may store the registration card key information received by the user terminal communication module 210 in the user terminal memory 240.

When the user tries to change the authority information and the expiration date information stored in the card key 100 through the user terminal 200 as illustrated in FIG. 4, the card key communication module 120 may transmit the card key information stored in the card key memory 110 to the user terminal communication module 210.

The user terminal processor 220 may determine whether to change the authority information and the expiration date information stored in the card key memory 110 based on the received card key information.

Particularly, the user terminal processor 220 may determine whether the card key information received from the card key communication module 120 is included in the registration card key information stored in the card key memory 110. When the card key information is included, the user terminal processor 220 may change the authority information and the expiration date information based on information input to the user terminal input device 230.

Through this, the user may change the authority information and the expiration date information stored only for the card key 100 registered in the vehicle 300 using the user terminal 200.

The method of controlling the user terminal 200 in some forms of the present disclosure described with reference to FIGS. 1 to 5B so far may be implemented in the form of a program that can be driven by the user terminal 200.

Here, the program may include a program command, a data file, a data structure, or the like alone or in combination. The program may be designed and produced using machine code or high-level language code. The program may be specially designed to implement the above-described method for code correction, or may be implemented using various functions or definitions previously known to and available to those skilled in a computer software field. The program for implementing the method for controlling the user terminal 200 described above may be recorded on a recording medium readable by the user terminal processor. In this case, the recording medium may be the user terminal memory 240.

The user terminal memory 240 may store a computer program that generates an authority information change signal for changing the authority information stored in the card key 100 based on a user input received by the user terminal input device 230.

The user terminal memory 240 may store a computer program that controls the user terminal communication module 210 to transmit the generated authority information change signal to the card machine 100.

The user terminal memory 240 may store the registration card key information received by the user terminal communication module 210 from the vehicle communication module 310 in the user terminal memory 240, and may determine whether the card key information received from the card key communication module 120 is included in the registration card key information. When the card key information is included, the user terminal memory 240 may store the computer program that controls the user terminal communication module 210 to change the authority information and the expiration date information based on the user input.

The user terminal memory 240 may generate an expiration date information change signal for changing the expiration date information stored in the card key 100 based on the user input received by the user terminal input device 230, and may store the computer program that controls the user terminal communication module 210 to transmit the generated expiration date information change signal to the card machine 100.

Figure 6:
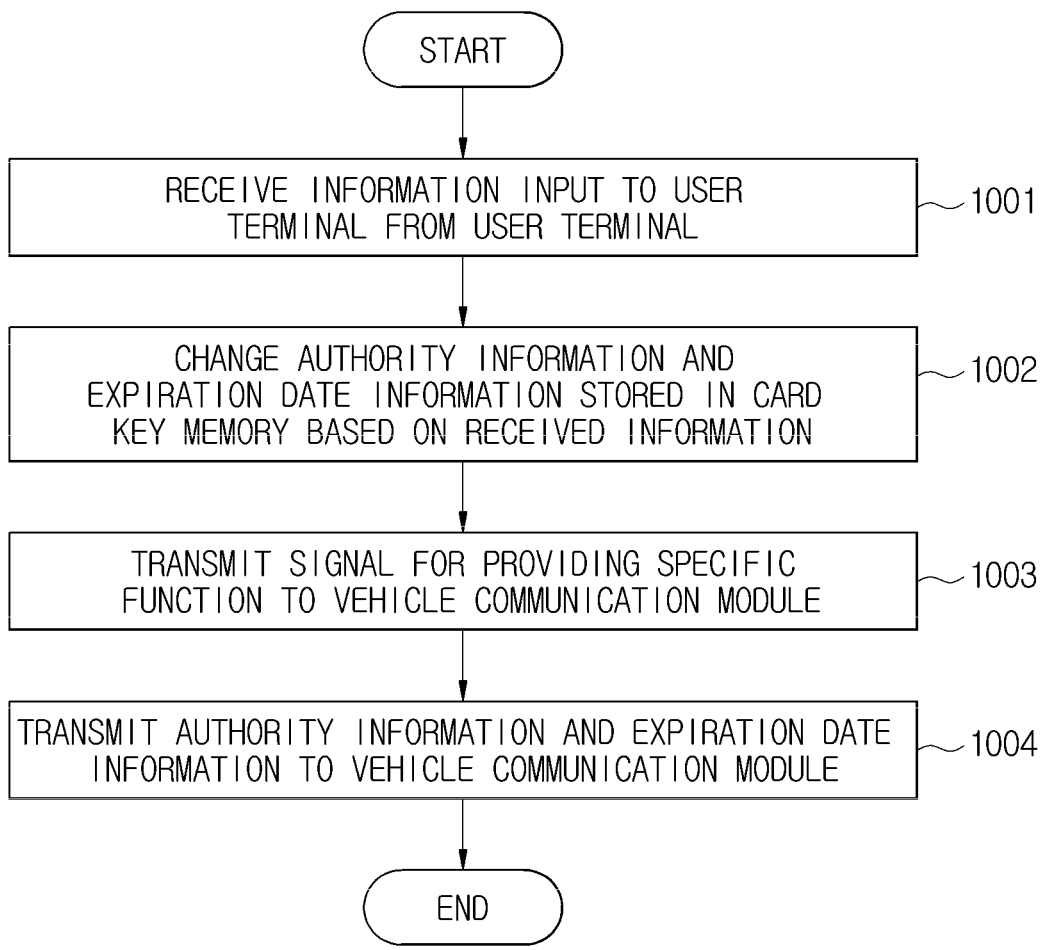
FIG. 6 is a view illustrating a flowchart of a procedure for transmitting authority information and expiration date information in which a card key has been changed to a vehicle in one form of the present disclosure.

FIG. 6 is a view illustrating a flowchart of a procedure for transmitting authority information and expiration date information in which a card key has been changed to a vehicle in some forms of the present disclosure. This is only a preferred form for achieving the object of the disclosure, and of course, some configurations may be added or deleted as necessary.

Referring to FIG. 6, when the user wants to change the authority information and the expiration date information stored in the card key memory 110, the user may input the information into the user terminal 200.

The user may input the specific function that is intended to limit future use, or input the specific function that was originally limited but intended to be used later and a period in which the specific function is allowed to be provided in the user terminal input device 230. At this time, the card key communication module 120 may receive the information input to the user terminal 200 from the user terminal communication module 210 (1001).

The authority information and the expiration date information stored in the card key memory 110 may be changed based on the input information (1002). At this time, the expiration date information may be changed differently for each specific function.

The user may allow the card key communication module 120 to communicate with the vehicle communication module 310 by accessing the card key 100 to the communication module corresponding to the specific function. At this time, the card key communication module 120 may transmit a signal for receiving the specific function to the vehicle communication module 310 (1003). The vehicle communication module 310 may transmit the received signal to the vehicle processor 320. The vehicle processor 320 may determine whether the card key information included in the received signal is included in the registration card key information stored in the vehicle memory 330, and if so, may determine that the card key 100 is registered in the vehicle 300 and provide the specific function requested from the card key 100.

The card key communication module 120 may transmit the authority information and the expiration date information stored in the card key 100 to the vehicle communication module 310 (1004).

Figure 7:
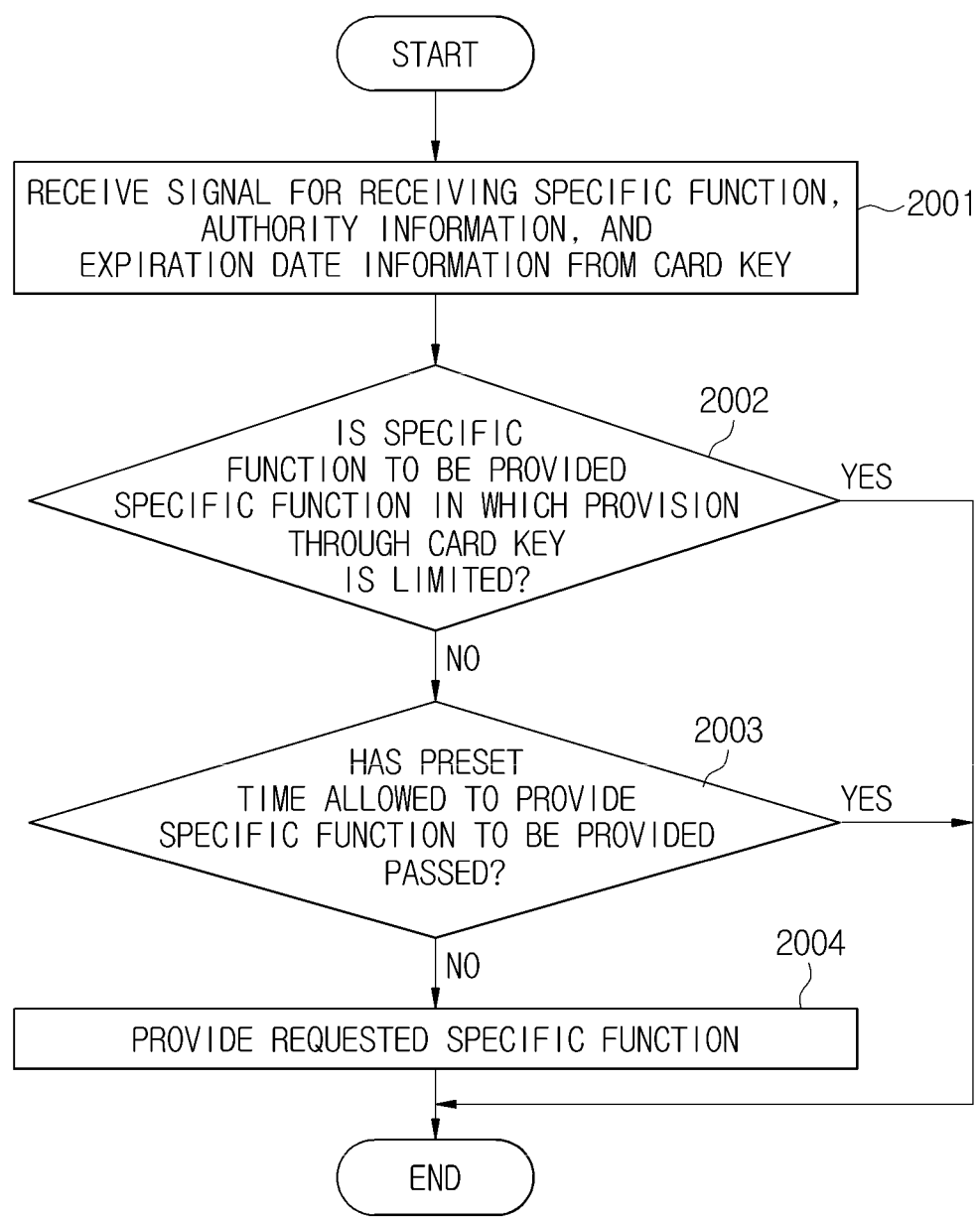
FIG. 7 is a view illustrating a flowchart of a procedure for providing a specific function requested from a card key based on authority information and expiration date information received by a vehicle in one form of the present disclosure.

FIG. 7 is a view illustrating a flowchart of a procedure for providing a specific function requested from a card key based on authority information and expiration date information received by a vehicle in some forms of the present disclosure.

Referring to FIG. 7, the vehicle communication module 310 may receive the signal for receiving the specific function, the authority information, and the expiration date information from the card key communication module 120 (2001).

The vehicle processor 320 may determine whether the specific function to be provided is a limited specific function based on the authority information (2002).

Particularly, when the authority information includes the information limiting the specific function requested from the card key 100, the vehicle processor 320 may not provide the requested specific function (YES in 2002).

On the other hand, when the authority information does not include the information limiting the specific function requested from the card key 100, the vehicle processor 320 may determine whether it is a time during which provision of the requested specific function is allowed (NO in 2002).

The vehicle processor 320 may determine whether the preset time for which the provision of the specific function to be provided is allowed has passed (2003).

Particularly, when the preset time included in the expiration date information has passed, the vehicle processor 320 may not provide the requested specific function (YES in 2003).

On the other hand, when the preset time included in the expiration date information has not yet passed, the vehicle processor 320 may determine that the time when the specific function is requested is the time when the specific function is allowed to be provided (NO in 2003).

The vehicle processor 320 may provide the specific function requested through the card key 100 (2004).

In some forms of the present disclosure, the user may change a vehicle control authority range of the card key for each function using the user terminal, and a period during which a vehicle control of the card key is allowed may be changed.

Forms of the disclosure have thus far been described with reference to the accompanying drawings. It should be apparent to those of ordinary skill in the art that the disclosure may be practiced in other forms than the forms as described above without changing the technical idea or essential features of the disclosure. The above forms are only by way of example, and should not be interpreted in a limited sense.

What is claimed is:

1. A card key for receiving specific functions from a vehicle, comprising: a card key memory configured to store authority information for controlling the specific functions of the vehicle; and a card key communication module configured to: transmit, to a vehicle communication module, a signal for receiving the specific functions and the stored authority information; receive information input to a user terminal from the user terminal, wherein the stored authority information is changed based on the input information; and receive, from the vehicle and in response to transmitting the signal, the specific functions, wherein the specific functions include at least one of a door unlock function and an engine start function of the vehicle from a vehicle.

2. The card key according to claim 1, wherein the card key memory is configured to: store card key information, wherein the authority information is changed based on the input information in response to a case where card key information is included in registration card key information stored in the user terminal.

3. The card key according to claim 2, wherein: the registration card key information is information of the card key registered in the vehicle received by the user terminal from the vehicle, and the card key information is information including the authority information.

4. The card key according to claim 1, wherein: the specific functions are at least one function provided by the vehicle, and the authority information includes information about functions that are allowed to be provided through the card key among the specific functions and functions to which provision is limited.

5. The card key according to claim 1, wherein: the specific functions include the door unlock function and the engine start function of the vehicle using the card key, and the authority information includes information for limiting a provision of the engine start function using the card key by the vehicle.

6. The card key according to claim 5, wherein: the specific functions further include a trunk unlock function of the vehicle using the card key, and the authority information includes information for limiting a provision of the door unlock function using the card key by the vehicle.

7. The card key according to claim 1, wherein: the card key memory is configured to store expiration date information to determine whether or not the vehicle provides the specific functions, the card key communication module is configured to transmit the stored expiration date information to the vehicle communication module, and the stored expiration date information is changed based on the input information.

8. The card key according to claim 1, wherein the card key communication module is configured to: communicate with the vehicle or the user terminal in a Near Field Communication (NFC) form.

9. A method of controlling a vehicle that provides specific functions in which a card key is used, comprising: receiving, by a vehicle communication module, a signal for providing the specific functions from the card key; receiving, by the vehicle communication module, changed authority information based on information input to a user terminal from the card key; determining, by a processor, whether to provide the specific functions based on the authority information; and providing, by the processor, the specific functions, wherein the specific functions include at least one of a door unlock function and an engine start function of the vehicle.

10. The method according to claim 9, wherein the authority information is changed based on the input information in response to a case where card key information is included in registration card key information stored in the user terminal.

11. The method according to claim 10, further comprising: transmitting registration card key information stored in a vehicle memory to a user terminal communication module, wherein the registration card key information is information of the card key registered in the vehicle, and the card key information is information including the authority information.

12. The method according to claim 9, wherein: the specific functions are at least one function provided by the vehicle, and the authority information is information about functions that are allowed to be provided through the card key among the specific functions and functions to which provision is limited.

13. The method according to claim 9, wherein: the specific functions include the door unlock function and the engine start function of the vehicle using the card key, and the authority information includes information for limiting a provision of the engine start function using the card key by the vehicle.

14. The method according to claim 13, wherein: the specific functions further include a trunk unlock function of the vehicle using the card key, and the authority information includes information for limiting a provision of the door unlock function using the card key by the vehicle.

15. The method according to claim 9, further comprising: receiving expiration date information changed based on information input to the user terminal from the card key; and determining whether to provide the specific functions requested from the card key based on the expiration date information.

16. The method according to claim 9, wherein receiving the signal from the card key and the receiving the authority information comprise: receiving through a Near Field Communication (NFC) communication form.

17. A non-transitory computer readable medium containing a program recorded there on, the program to direct a processor to: generate an authority information change signal for changing authority information stored in a card key based on a user input received by a user terminal input device; control a user terminal communication module to transmit the generated authority information change signal to the card key; and determine whether or not a vehicle provides specific functions requested from the card key based on the authority information, wherein providing the specific functions of the vehicle includes providing at least one of a door unlock function and an engine start function of the vehicle to the card key.

18. The computer readable medium according to claim 17, wherein the processor is further configured to: store registration card key information received by the user terminal communication module from a vehicle communication module in a user terminal memory; determine whether card key information received from a card key communication module is included in the registration card key information; and generate the authority information change signal for changing the authority information stored in the card key based on the card key information included in the registration card key information.

19. The computer readable medium according to claim 17, wherein the processor is further configured to: generate an expiration date information change signal for changing expiration date information stored in the card key based on the user input received by the user terminal input device; control the user terminal communication module to transmit the generated expiration date information change signal to the card key; and determine whether or not the vehicle provides specific functions requested from the card key based on the expiration date information.

* * * * *